United States Patent [19]

Kamens

[11] 4,393,148

[45] Jul. 12, 1983

[54] REACTION OF T-ALKYLHYDRAZINIUM SALTS AND OGRANIC PEROXIDES TO FOAM UNSATURATED POLYESTER RESINS

[75] Inventor: Ernest R. Kamens, Tonawanda, N.Y.

[73] Assignee: Pennwalt Corporation, Philadelphia, Pa.

[21] Appl. No.: 431,545

[22] Filed: Sep. 30, 1982

[51] Int. Cl.$^3$ ............................................. C08J 9/10
[52] U.S. Cl. ...................................... 521/93; 521/95; 521/96; 521/124; 521/125; 521/138; 521/140
[58] Field of Search ................... 521/93, 95, 96, 124, 521/138, 140, 125

[56] References Cited

U.S. PATENT DOCUMENTS

| | | |
|---|---|---|
| 3,920,589 | 11/1975 | Jacobs et al. ........................ 521/138 |
| 3,920,590 | 11/1975 | Jacobs et al. ........................ 521/138 |
| 3,920,591 | 11/1975 | Jacobs et al. ........................ 521/138 |
| 3,993,609 | 11/1976 | Kamens et al. ...................... 521/95 |
| 4,029,615 | 6/1977 | Kamens et al. ..................... 521/138 |
| 4,101,464 | 7/1978 | Kamens et al. ..................... 521/138 |
| 4,322,502 | 3/1982 | Stott et al. ......................... 521/124 |
| 4,327,196 | 4/1982 | West .................................. 521/124 |

*Primary Examiner*—Morton Foelak

[57] ABSTRACT

Low density foams are prepared from an admixture which comprises a medium which is polymerizable and/or crosslinkable by free radical initiation, a t-alkylhydrazinium salt blowing agent, a peroxide curing agent, a suitable surfactant, and at least one transition metal salt promoter wherein at least one of the metal salts is a compound of iron or copper. The t-alkylhydrazinium salt blowing agent in the presence of an effective amount of the transitional metal salt promoter improves the efficiency of the process.

11 Claims, No Drawings

REACTION OF T-ALKYLHYDRAZINIUM SALTS AND OGRANIC PEROXIDES TO FOAM UNSATURATED POLYESTER RESINS

BACKGROUND OF THE INVENTION

This invention is related to the foaming of a medium which is polymerizable and/or crosslinkable by free radical initiation. More particularly, it comprehends the crosslinking of unsaturated polyester resins using t-alkylhydrazinium salt blowing agents with transition metal salt promoters.

The foaming and curing of unsaturated polyester resins are well known in the prior art. U.S. Pat. No. 3,920,589 discloses the foaming and curing of an unsaturated polyester resin using a peroxide curing agent, a transition metal salt promoter, hydrazine or a sulfonyl hydrazide blowing agent, and a halogen redox compound. U.S. Pat. No. 3,920,590 discloses the foaming and curing of an unsaturated polyester resin using a peroxide curing agent, a cobalt promoter, and hydrazine or oxybis (benzesulfonyl) hydrazide blowing agent, wherein both the peroxide and cobalt are present in high concentration levels. U.S. Pat. No. 3,920,591 discloses the foaming and curing of an unsaturated polyester resin using a peroxide curing agent, organo-metallic salt promoters of transition metals, hydrazine or a sulfonyl hydrazide blowing agent, and an aliphatic amine redox compound. Published European patent application No. 0048050 discloses the foaming and curing of an unsaturated polyester resin using a peroxide curing agent, an organometallic salt promoter, and a t-alkyl hydrazine blowing agent. None of the above-mentioned prior art teaches the present invention.

SUMMARY OF THE INVENTION

The present invention pertains to a new foamable and curable composition comprising an admixture of a medium which is polymerizable and/or crosslinkable by free radical initiation, a peroxide, at least one transition metal salt promoter where at least one of the metals is selected from the class of iron and copper, and a t-alkylhydrazinium salt blowing agent. A suitable surfactant may also be included in this admixture. Foamed structures of varying low densities with a fine uniform cell structure and without cracks or voids are easily prepared from compositions of this invention.

DETAILED DESCRIPTION OF THE INVENTION

Polymerizable Medium

By the term "polymerizable medium" is meant the fluid phase with which the blowing agent, peroxide, metal salts, etc. are mixed. It is essential that one component in this medium be polymerizable or cross-linkable by free radical initiation, i.e. the component is a resin polymerizable or cross-linkable by free radical initiation or is a vinyl or vinylidene monomer. A detailed description of suitable polymerizable mediums is set forth in U.S. Pat. No. 3,993,609 where such mediums are identified as typed A. B. C. D. or E and is herein incorporated by reference.

Medium A: A reactive polymeric resin, or mixture of reactive resins, or a mixture of a reactive polymeric resin (or resins) with an unreactive resin or resins.

Medium B: Reactive resin(s) and/or unreactive resin(s) dissolved and/or dispersed in a polymerizable monomer or mixture of monomers.

Medium C: A reactive resin or mixture of resins at least one being reactive, dissolved or dispersed in an inert solvent or diluent.

Medium D: A monomer or mixture of monomers.

Medium E: Combinations of any or all of the above.

Many of the physical properties of the resultant foams will depend on the nature of the polymerizable medium in a manner well understood by those skilled in the art. Also, the number and spacing of cross-linkable functions in the resins will affect the degree of rigidity or flexibility of the cured foamed product as is well known to those skilled in the art. A wide variety of inert liquid diluents may be added to any of the above described polymerization media to give appropriate viscosity, physical properties and/or cost.

Blowing Agents

The blowing agents which are useful in this invention are t-alkyl hydrazinium salts having the following general structure

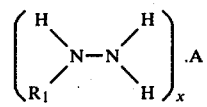

where X is an integer 1,2,3, or 4 and A is an inorganic or organic acid; when X is 2, A is a diprotic acid; when X is 3, A is a triprotic acid; and when X is 4, A is a terprotic acid. $R_1$ is a tertiary alkyl radical having from about 4 to about 8 carbons.

Examples of t-alkylhydrazinium salts include but are not limited to the following: di-t-butylhydrazinium sulfate, t-butylhydrazinium bisulfate, t-butylhydrazinium chloride, mono-t-butylhydrazinium phosphate, t-butylhydrazinium benzoate, t-butylhydrazinium acetate, di-t-butylhydrazinium succinate, t-butylhydrazinium di-(2-ethylhexyl) phosphate, mono-t-butylhydrazinium oxalate, di-t-butylhydrazinium oxalate, t-butylhydrazinium neodecanoate, di-t-butylhydrazinium azelate, t-butylhydrazinium pivalate, t-butylhydrazinium p-toluenesulfonate, t-butylhydrazinium methanesulfonate, t-butylhydrazinium sulfonate, tetra-t-butylhydrazinium 1,2,4,5, benzenetetracarboxylate, di-t-butylhydrazinium terephthalate, mono t-butylhydrazinium dipicolinate, di-t-butylhydrazinium carbonate, t-butylhydrazinium sodium sulfate, t-butylhydrazinium malate, t-butyhydrazinium tributyl sulfate and t-amylhydrazinium chloride.

Two of the most preferred blowing agents are t-butylhydrazinium chloride (t-BZ.HCl) and di-t-butylhydrazinium sulfate [(t-BZ)$_2$.H$_2$SO$_4$]. These compounds are solids which can be dissolved in water or alcohol to facilitate mixing into the resin or dispensing through pumping and metering equipment. These compounds provide good quality foams over a wide density range and in a variety of resin types.

Generally the amount of blowing agent can be varied over a relatively wide range to achieve desired foam densities; however, they are typically used in amounts ranging from about 0.1 to about 10 phr and preferably from about 0.2 to about 5 phr. The blowing agents may be used alone or in combination with other blowing agents.

Peroxides

The process of the present invention employs in conjunction with the liquid resin, compounds which are capable of forming free radicals. These compounds are typically peroxides which are capable of being activated by transition metal salts and/or amines.

Peroxides which are activated by transition metal salts include those that have the general structure

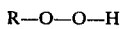

where R— can be H, alkyl, aralkyl or

Examples of such useful peroxides include but are not limited to hydrogen peroxide, cumene hydroperoxide, t-butyl hydroperoxide, methyl ethyl ketone peroxide, 2,4-pentanedione peroxide, methyl isobutyl ketone peroxide and others.

Peroxides that are activated by amines include those that can be characterized by the general structure:

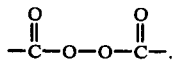

Useful peroxides of this type include the diacyl peroxides, for example dibenzoyl peroxides, diisobutyryl peroxide, acetyl peroxide, 2,4-dichlorobenzoyl peroxide and lauroyl peroxide. Also, for example, the peroxydicarbonates such as di(n-propyl) peroxydicarbonate, di(sec-butyl) peroxydicarbonate, di(2-ethylhexyl) peroxydicarbonate, di (2-phenoxyethyl) peroxydicarbonate, and the like may be used.

Peroxides which are especially useful for curing at low temperatures (i.e., 15°–30° C.) are the hydroperoxides, ketone peroxides and diacyl peroxides. These peroxides are well known to those skilled in the art. A detailed description of these compounds can be found in "Encyclopedia of Chemical Technology", Third Edition, Vol. 17, pp 27–90.

Mixtures of two or more peroxides may also be used in this invention wherein at least one of the peroxides is of the type which can be activated to cure at low temperatures.

The preferred peroxides include hydroperoxides such as cumeme hydroperoxide, peroxy derivatives of ketones such as methyl ethyl ketone peroxide and peroxydicarbonates such as di(sec-butyl) peroxydicarbonate. Solutions of metyl ethyl ketone peroxide in plasticizers are the most preferred. These are commerically available as solutions containing approximately 30–40 percent by weight of peroxidic compound(s) in plasticizers or solvents such as dimethyl phthalate.

As is well known by those skilled in the art the amount of peroxide used will depend upon the nature of the peroxide, the curing temperature, the resin employed, the amount of blowing agent and the type of blowing agent. The amount of peroxide can range from about 0.2 to about 20 parts per hundred parts of resin (phr) and preferrably from about 0.5 to 10 phr. The ratio of peroxide to blowing agent is generally in the range of 1:1 to 10:1 and preferrably 4:1 to 7:1 on weight basis. Specific examples of useful and effective peroxide to blowing agent ratios are illustrated in the exmples hereinafter.

Promoters

In the practice of the present invention compounds of iron and copper are unique as promoters (also known as accelerators) in their ability to synchronize the gas generation and the curing reaction. If the resin cures before expansion and gas generation is complete, the foam is likely to contain splits, cracks, or other voids. On the other hand, if the resin does not gel sufficiently, gases will not be retained and high density foams with poor cell structure will result. When compounds of iron are employed as the promoter, the foams have a fine uniform cell structure and are free of splits, cracks, and other imperfections.

Examples of useful metal compounds include but are not limited to ferric chloride, ferrous chloride, ferrous naphthenate, ferrous sulfate, ferric sulfate, ferric nitrate, ferric ammonium sulfate, copper naphthenate, cupric chloride and cuprous chloride. The preferred metal salts are ferric chloride and ferrous chloride.

In the practice of the present invention, mixtures of transition metal salts, wherein at least one of the metal salts is a compound of iron or copper, may be used advantageously. For example, cobalt salts may be used in combination with the aforementioned salts to increase the rate of foaming, if desired.

To facilitate mixing of the metal salt in the resin medium it is often desirable to dissolve the metal salt in a suitable solvent. The inorganic salts can generally be dissolved in a polar solvent such as alcohol or water. The organic salts may be dissolved in solvents such as xylene, toluene, decane, etc.

Generally the amount of metal salt is in the range of about 0.01 to about 2.0, preferably 0.05 to 1.0, parts per 100 parts by weight of the resin. When metal copromoters such as cobalt salt are employed to obtain faster expansion or to increase the degree of cure in thin layers of foam, the amount of copromoter is generally 0.0005 to 0.10, preferably 0.001 to 0.01, parts per 100 parts of resin on a weight basis. Generally the optimum amount of metal compound(s) utilized is dependent upon the specific metal compound and is influenced by compound characteristics such as solubility and compatibility in the resin medium.

Processing Conditions

In general and broadly stated in the process of the present invention, the combination of the t-butylhydrazinium salt blowing agent with a peroxide and a compound of iron or copper in a free radically polymerizable medium generates gaseous decomposition products at room temperature to provide foamed polymeric structures. The reaction produces free radicals simultaneously with gas generation which initiate polymerization to provide a crosslinked matrix. At the initial stage of reaction, the matrix is partially crosslinked, i.e. the matrix has fluidity characteristics such that the gases generated cause the matrix to expand. The gas bubbles, dispersed through the gelled matrix, produce either a "closed" or "open" cell configuration depending upon the amount and rate of evolution of the gas and the fluidity and strength characteristics of the resin medium during the period of gas generation. The major portion of the crosslinking reaction occurs after gas generation has ceased. This stage of reaction is accompanied by a significant increase in temperature. When the optimum concentration of reactants is employed, the resulting expanded and shaped resin is fully cured without the need for further post curing.

Thus, in the process of the present invention, the physical environmental conditions of temperature and pressure, the manipulative techniques and equipment employed in mixing components, and the shaping of the cellular structure during or after its production as well as after-treating by curing, and the like, may vary widely. Some such variables are discussed in greater detail below for illustrative purposes.

Mixing Techniques

Any conventional mixing method can be used to distribute the reactants throughout the resin medium. It is well known to those skilled in the art that organic peroxides and promoters should not be mixed together directly. Such direct contact can result in hazardous decomposition of the peroxide. To avoid such contact the reactive ingredients are preferably added to the resin in the following order: metal salt(s), blowing agent, peroxide. Each ingredient should be thoroughly mixed into the resin before adding the next ingredient. The peroxide may also be added as a second component in processes (eg. spray-up) where the equipment is designed to dispense a mixture of resin promoter(s) and t-alkyl hydrazinium salt blowing agent as one component and peroxide as a separate component.

Temperature Variation

Generally the reaction will occur at normal room temperatures (ie., 15°–30° C.) and the speed of reaction at such temperatures will usually be suitable. The use of lower or higher temperatures may also be used.

Optional Additives to Medium

The density of the foamed product structure can be controlled by the amount of reactants employed. In addition, the amount of foaming and hence the density of the final cellular structure, can be augmented by the use of gases or liquids in the resin medium which have boiling points such that the liquids vaporize during either the blowing or curing reaction. Liquids or gases of this class generally exhibit significant vapor pressure below the curing temperatures. Representative examples are as follows:

| Pentane | Trans-2-butene |
| Hexane | 1-Pentene |
| Heptane | $CFCl_3$ |
| Cis-2-butene | $C_2F_3Cl_3$ |

Other compounds that vaporize below 100° C. can be used as well. In some cases volatile compounds having boiling points greater than 100° C. can be used to enhance foaming such that densities in the range of 1–5 lb/ft$^3$ are easily obtained.

It has also been found useful to add surfactants to the resin medium to promote uniformity of cell size in the final product. Such additives are particularly valuable in systems employing high concentrations of the blowing reactants. Such surfactants may be of the cationic (quaternary salts), anionic (sulfonates) and nonionic (ethylene oxide condensates) type. Some suitable surfactants include materials such as: metallic soaps, alkylene oxide-phenol addition products, alkyl aryl sulfates and sulfonates, dimethyl siloxane polymers, and cationic siloxanes of the general formula shown in U.S. Pat. No. 3,642,670 which are herein incorporated by reference. Air will also serve as a nucleating agent. Only a small amount, well dispersed as small bubbles throughout the resin, is needed (as distinguished from the case where one attempts to foam the resin by beating air into it). It is sufficient to mix the resin medium with the blowing compound hereof (and other components hereof as desired) in the presence of air. In the experiments hereof carried out in paper cups and the like, this was accomplished simply by mixing with an electric stirrer. When one uses molding equipment involving pumped stream(s) and a mixing head, one simply bleeds some air into the mixing head.

Hollow ceramic, glass, or graphite spheres can be added to the resin medium in order to decrease further the density of the final formed structure. These materials have densities less than that of the polymerized matrix and can be utilized to impart desired density or decorative properties to the foam.

Fillers may be used as components in any of the reactive mediums described above following techniques well known to those skilled in the art of casting and molding resins. Fillers improve fabrication characteristics, reduce shrinkage, lower cost, and improve physical properties. A wide variety of fillers have been found to be compatible with the foaming process of this invention. Milled fiberglass and cotton flock are re-enforcing fillers and tend to increase green strength, compressive strength and impact strength. Bulk fillers such as wood flours, clays, carbonates, and silicates decrease the cost and reduce thermo-expansion and shrinkage. Mineral fillers such as borax and alum are known to effectively reduce the burning rates. Examples of fillers include the following: pecan shell flour, milled fiberglass, wood chips, sawdust, vermiculite, carbon black, magnesium sulfate, cotton flock, calcium carbonate, mica steel wire, aluminum powder, polystyrene powder, polypropylene powder, polyethylene powder, polyvinylchloride powder, and powdered crosslinked butadieneacrylonitrile rubber.

EXAMPLES

The following examples are provided to illustrate preferred embodiments of the invention and are not intended to restrict the scope thereof. All parts are parts by weight and percentages are expressed as weight percentages unless indicated otherwise.

STANDARD PROCEDURE

The resin and all other components except the peroxide catalyst were weighed into 9-ounce waxed paper cups and blended using a high shear electric mixer. The peroxide catalyst was then added and blended in; at this time an electric timer was activated in order to obtain gel times (time to peak foaming). After mixing at high shear for about 10-seconds, 30 gram portions of the mixtures were poured into 3-ounce paper cups and allowed to foam. Gel times and foam densities were determined from these samples. Densities were determined by the water displacement method. This standard procedure was used in all of the experiments unless indicated otherwise.

TEST RESINS (Unless otherwise noted)

Resin A—Laminac 4123 containing 5 phr additional styrene monomer and 1 phr Dow Corning 193 surfactant—Laminac 4123 is an orthophthalic acid-based resin produced by U.S.S. Chemicals. This resin contains approximately 30% styrene monomer.

Resin B—Laminac PDL-989 containing 5 phr additional styrene monomer and 1.0 phr of Dow Corning 193 surfactant—Laminac PDL-989 is an isophthalic acid-based, general purpose molding resin produced by U.S. Chemicals. The resin contains approximately 35% styrene monomer.

EXAMPLE #1

Blowing agents of the present invention, t-alkylhydrazinium salts, were tested. The resin used was resin A and the concentration of MEKP (Lupersol DDM-9[1]) was 3.0 phr in all cases; the results are as follows:

| t-alkyl-hydrazinium salt | % Salt in Diluent | Solution added to Resin (phr) | 45% Aqueous FeCl$_3$ (phr) | Gel Time (Min) | Foam Density (lb/ft$^3$) |
|---|---|---|---|---|---|
| None | — | — | 0.3 | >60 | >70 |
| t-BZ.HCl | 40% in H$_2$O | 1.25 | 0.3 | 2.9 | 28 |
| (t-BZ)$_2$.H$_2$SO$_4$ | 50% in H$_2$O | 1.5 | 1.0 | 6.4 | 21 |
| t-BZ benzoic acid | 50% in Methanol | 2.25 | 1.0 | 1.4 | 24 |
| (t-BZ)$_2$-succinic acid | 33% in Methanol | 2.4 | 1.0 | 1.5 | 25 |
| t-BZ acetic acid | 50% in Methanol | 1.6 | 1.0 | 1.5 | 23 |
| t-BZ-di-(2-ethylhexyl)-phosphoric acid | 50% in Methanol | 4.1 | 1.0 | 1.3 | 23 |
| t-BZ-neodecanoic acid | 30% in Methanol | 4.1 | 0.75 | 1.4 | 24 |
| t-BZ-pivalic acid | 36% in Methanol | 2.8 | 0.75 | 4.8 | 29 |
| (t-BZ)$_4$-1,2,4,5,-benzene-tetracarboxylic acid | 30% in H$_2$O | 2.7 | 0.75 | 4.8 | 27 |
| (t-BZ)-carbonic acid | 50% in Methanol | 1.0 | 0.80 | 1.7 | 25 |
| t-AZ.HCl | 40% in H$_2$O | 1.4 | 0.40 | 4.3 | 31 |

(1) Lupersol DDM-9 is a methyl ethyl ketone peroxide containing 9% active oxygen, available from Pennwalt Corp., Lucidol Division.
(2) t-BZ = t-Butylhydrazine
t-AZ = t-Amylhydrazine This table shows that a wide variety of blowing agents have been found to be useful in this invention.

EXAMPLE #2

A blowing agent of the present invention, t-butylhydrazinium chloride, was tested at a concentration of 0.0054 mole using resin B; the concentration of the MEKP was 3.0 phr (Lupersol DDM-9). The results are set forth in the table below.

For the sake of comparison, prior art blowing agents, sulfonyl hydrazides and t-butylhydrazine, were tested at the same concentration of 0.0054 mole as the t-butylhydrazinium chloride was tested and the results were also listed in the table below.

| Blowing Agent | % in Diluent | Solution Added to Resin (phr) | 45% Aqueous FeCl$_3$ (phr) | Gel Time (Min) | Foam Density (lb/ft$^3$) |
|---|---|---|---|---|---|
| t-Butyl-hydrazinium chloride | 40% in H$_2$O | 1.7 | 0.5 | 2.1 | 26 |
| t-Butyl-hydrazine | 58% in | 0.82 | 0.5 | 0.4 | 70 |
| Benzene-sulfonyl-hydrazide | 50% in DMF[1] | 1.8 | 0.5 | >30 | — |
| p-Toluene sulfonyl-hydrazide | 50% in DMF | 2.0 | 0.5 | >30 | — |
| 4,4-Oxybis (benzenesulfonylhydrazide) | 40% in DMF | 2.4 | 0.5 | >30 | — |

[1]DMF = N,N-dimethylformamide

This table shows that the prior art compounds are not effective in the present invention. Although the t-butylhydrazine does gel the resin, it does not significantly foam the resin. The sulfonyl hydrazides evolved gas very slowly in the resin, eventually gelling the resin with little or no apparent foam being produced.

EXAMPLE #3

A variety of iron salts were tested using the same basic formulation and the results recorded in the table as follows:

| Formulation Component | Grams |
|---|---|
| Resin A | 100 |
| 40% Aqueous tBZ.HCl | 1.25 |
| Lupersol DDM-9 | 3.0 |
| Iron Compound | (Equivalent to 0.045 parts iron) |

| Iron Compounded Tested | Gel Time, (Minutes) | Density (Lb/Ft$^3$) |
|---|---|---|
| None (Control) | 8.0 | 71 |
| Iron Napthenate (6% Iron) | 2.1 | 42 |
| Ferrous Sulfate (30% Aqueous) | 4.3 | 40 |
| Ferric Sulfate (22% Aqueous) | 7.5 | 34 |
| Ferric Nitrate (50% Aqueous) | 7.0 | 39 |
| Ferric Ammonium Sulfate (43% Aqueous) | 10.0 | 42 |
| Ferrous Chloride (40% Aqueous) | 3.0 | 34 |
| Ferric Chloride (45% Aqueous) | 4.1 | 28 |

This table shows that both the ferric and ferrous ions in organic and inorganic compounds are effective in this invention. The results further show that the chloride salts are preferred because they give fast reactivity with low foam density.

EXAMPLE #4

The transitional metal salt, FeCl$_3$, of the present invention was tested at different concentrations using the same basic formulation and recorded with the results in the table below. Comparative tests were also run using an iodine solution and halogen containing compounds using the same basic formulation. The results were also set forth in the table below.

| Formulation | Grams |
|---|---|
| Resin A | 100 |
| 40% tBZ.HCl (H$_2$O) | 1.25 |
| MEK Peroxide (DDM-9) | 3.0 |

-continued

| Formulation | Grams |
| --- | --- |
| Halogenated Compound | Variable as per table |

| Halogenated Compound | Grams | Gel Time (Min) | Foam Density (lb/ft³) |
| --- | --- | --- | --- |
| None - Control | — | 8.0 | 71 |
| 45% FeCl₃ (H₂O) | 0.1 | 7.1 | 38 |
| 45% FeCl₃ (H₂O) | 0.3 | 4.1 | 28 |
| 50% KI (H₂O) | 0.2 | 9.0 | 61 |
| 50% KI (H₂O) | 0.5 | 13.6 | 50 |
| 49% HF (H₂O) | 0.2 | 18.4 | 71 |
| 38% HCl (H₂O) | 0.2 | 23.4 | 71 |
| 12.7% Iodine Soln. | 0.2 | 13.5 | 71 |
| 55% HI (H₂O) | 0.2 | 12.3 | 55 |
| 25% KCl (H₂O) | 0.5 | 4.0 | 70 |

This table shows that $FeCl_3$ behaves differently in the present invention than an iodine solution and the other halogen containing compounds. $FeCl_3$ provides faster gel times and lower foam densities at lower concentrations than the other non-transitional metal halogen containing compounds.

EXAMPLE #5

The organic transitional metal salt iron naphthenate, was tested. For the sake of comparison, other organic metal salts were also tested. All of the tests used the same basic formulation and the results were recorded in the table below.

| Formulation Component | Grams |
| --- | --- |
| Resin A | 100 |
| 40% Aqueous t-BZ-HCl | 1.25 |
| Lupersol DDM-9 | 3.0 |
| Metal Compound | (Equivalent to 0.045 parts metal) |

| Metal Compound | Gel Time (Minutes) | Density (lb/ft³) |
| --- | --- | --- |
| None (Control) | 8.0 | 71 |
| Iron napthenate | 2.1 | 42 |
| Cobalt neodecanoate | 0.1 | 63 |
| Potassium napthenate | 1.2 | 67 |
| Zinc neodecanoate | 1.1 | 72 |
| Molybdenum octoate | 1.3 | 67 |
| Barium napthenate | 1.2 | 70 |
| Stannous octoate | 1.3 | 75 |
| Chromium octoate | 1.9 | 65 |
| Manganese neodecanoate | 0.9 | 68 |
| Calcium octoate | 1.0 | 64 |
| Lead octoate | 1.0 | 69 |
| Zirconium octoate | 2.2 | 70 |
| Cerium octoate | 1.3 | 67 |
| Sodium neodecanoate | 1.8 | 71 |
| Nickel octoate | 0.7 | 69 |
| Magnesium neodecanoate | 0.8 | 69 |

These results illustrate that the choice of metal promoter is especially critical in obtaining useful gel times and foam densities. In comparison to the other metals evaluated only the iron salts provide both a useful gel or working time combined with low foam densities. Cobalt, the promoter of the prior art, provides unacceptably short gel times (i.e., 0.1 min.) and understandably high foam density.

EXAMPLE #6

The different copper metal salts were tested using the same basic formulation and the results recorded in the table below. The components were mixed in 9-oz paper cups and allowed to foam in cup. Lupersol DDM-9 was added last to preblended mixture.

| Formulation Component | Grams |
| --- | --- |
| Resin A | 50 |
| 40% Aqueous t-BZ HCl | 0.63 |
| Lupersol DDM-9 | 1.5 |
| Copper Compound | (See below) |

| Copper Compound | Grams Added | Gel Time (Seconds) | Density (lb/ft³) |
| --- | --- | --- | --- |
| 5% Copper napthenate Soln. | 0.10 | 15 | 32 |
| 12% Cupric nitrate water | 0.10 | 15 | 26 |
| 10% Cupric chloride in methanol | 0.05 | 15 | 26 |
| 7% Cupric acetate in glycerol | 0.10 | 15 | 23 |
| 10% Cupric bromide in water | 0.05 | 15 | 25 |

These results illustrate that a variety of copper salts are effective in the process of the present invention.

EXAMPLE #7 t-Butyl and cumene hydroperoxides and di(sec-butyl) peroxydicarbonate were tested using resin A and the results were recorded in the following table:

| Component (phr) | | | |
| --- | --- | --- | --- |
| 40% Aqueous tBZ-HCl | 1.25 | 1.25 | 1.25 |
| 45% Aqueous FeCl₃ | 0.75 | 0.50 | 0.30 |
| 6% Cobalt napthenate | 0.20 | — | 0.40 |
| 0.5% Copper Solution | 0.05 | 0.10 | — |
| N,N—Dimethyl aniline | — | — | 0.30 |
| 90% t-Butyl hydroperoxide | 2.0 | — | — |
| 86% Cumene hydroperoxide | — | 3.0 | — |
| 99% Di(Sec-butyl)peroxy-dicarbonate | — | — | 4.0 |
| gel time, min | 2.2 | 0.8 | 3.3 |
| foam density, lb/ft³ | 22 | 37 | 11.5 |

These results illustrate that hydroperoxides and peroxydicarbonates are useful in the process of the present invention. These types of peroxides, as well as the ketone peroxides used in previous examples, provide foams with fine uniform cell structure and good physical properties.

EXAMPLE #8

Fillers are commonly used in resin formulations to reduce cost and/or improve properties. This example illustrates that popular fillers such as hydrated alumina and calcium carbonate are compatible with the process of the present invention.

| Component | | |
| --- | --- | --- |
| U.S.S. Chemicals MR 13037 Resin[1] (g) | 50 | 55 |
| 40% Aqueous tBZ-HCl (g) | 1.25 | 1.25 |
| 45% Aqueous FeCl₃ (g) | 0.30 | 0.30 |
| Hydrated alumina filler (g) | 50 | — |

-continued

| Component | | |
|---|---|---|
| Precipitated calcium carbonate (g) | — | 43 |
| Anhydrous magnesium sulfate (g) | — | 2 |
| gel time, seconds | 140 | 70 |
| foam density, lb/ft³ | 45 | 48 |

[1]An unsaturated polyester resin containing styrene monomer as the reactive diluent.

EXAMPLE #9

Potlife/spray-up

For spray-up and other methods of resin dispensing, this foaming system offers stable one-pot systems when allowing for separate metering of peroxide catalyst.

A masterbatch formulation consisting of the following components was prepared to check foaming reactivity and resin stability over a period of 48 hours.

| Component | Parts |
|---|---|
| Resin A | 100 |
| 40% Aqueous tBZ.HCl | 1.5 |
| 45% Aqueous FeCl₃ | 0.3 |
| 6% Cobalt napthenate | 0.10 |

Reactivity was checked upon initial preparation of mixture and after 24 and 48 hours by blending 3 grams of Lupersol DDM-9 into 100 grams of the mixture. The results were as follows:

| Lupersol DDM-9 Addition | Initial mix | after 24 hrs. | after 48 hrs. |
|---|---|---|---|
| Gel time, seconds | 90 | 100 | 120 |
| Foam density, lb/ft³ | 25 | 27 | 27 |
| Type cure on ⅛″ layer | Good | Good | Good |

EXAMPLE #10

Use of Freon-11 as an Auxiliary Blowing Agent

Vaporizing adjuvants enhance the amount of foaming effected by the blowing agents of the present invention. Effective compounds have boiling points such that they become gaseous during the early portions of the cure reaction; i.e., below 100° C.

This example illustrates the use of Freon-11 (trichlorofluoromethane) as an auxiliary blowing agent.

The following components were blended into the resin, styrene and Freon-11 mixtures and reacted with 3 grams of Lupersol DDM-9:

| Grams | |
|---|---|
| 1.25 | 40% Aqueous tBZ-HCl |
| 0.40 | 45% Aqueous FeCl₃ |
| 0.05 | 6% Cobalt napthenate |

Test Results:

| Component (g) | | | | | | | | |
|---|---|---|---|---|---|---|---|---|
| Resin[1] | 92 | 92 | 92 | 92 | 92 | 90 | 90 | 85 |
| Styrene | 8 | 7 | 6 | 5 | 3 | 2.5 | — | — |
| Freon-11 | — | 1 | 2 | 3 | 3 | 7.5 | 10 | 15 |
| gel, seconds[2] | 90 | 90 | 95 | 95 | 95 | 105 | 115 | 160 |
| density, lb/ft³[2] | 28 | 23 | 21 | 18 | 10.5 | 5.9 | 3.8 | 2.7 |

[1]Resin = Laminac 4123 containing 1.5% Dow Corning 193 surfactant.
[2]Taken from 10 gram samples poured into 3-ounce cups.

EXAMPLE #11

Foaming of other polymerizable media—acrylate syrup

An acrylic syrup was prepared by dissolving 35 parts (by wt.) of ELVACITE 2009 (a polymethylmethacrylate resin marketed by Du Pont) in 65 parts of methylmethacrylate monomer. This syrup, along with the components given below was successfully foamed to a rigid material (cumene hydroperoxide added last to preblended mixture):

| Components Blended | Grams |
|---|---|
| Methylmethacrylate syrup | 89 |
| Trimethylolpropanetrimethacrylate | 10 |
| Dow Corning 193 surfactant | 1.0 |
| 40% Aqueous tBZ-HCl | 1.25 |
| 45% Aqueous FeCl₃ | 0.20 |
| 6% Cobalt napthenate | 0.40 |
| 86% Cumene hydroperoxide | 3.0 |
| gel time, seconds | 120 |
| foam density lb/ft³ | 15.5 |

EXAMPLE #12

Foaming of other polymerizable media—vinyl ester type resin

| | 1 | 2 |
|---|---|---|
| Derakane 786* (g) | 99 | 99 |
| Dow Corning 193 Surfactant (g) | 1.0 | 1.0 |
| 40% Aqueous tBZ.HCl (g) | 1.5 | 1.5 |
| 45% Aqueous FeCl₃ (g) | 0.3 | 0.3 |
| 6% Cobalt neodecanoate (g) | — | 0.1 |
| Lupersol DDM-9 (g) | 3.0 | 3.0 |
| gel time, minutes | 3.8 | 2.0 |
| foam density, lb/ft³ | 33 | 30 |

*A product of Dow Chemical Co., containing styrene monomer as the reactive diluent.

EXAMPLE #13

U.S. Pat. No. 3,920,591 teaches that aliphatic amines may be used to "prevent or retard polymerization" thus assisting in the preparation of low density foams. The following experimental tests illustrate that in the process of the present invention aliphatic amines behave in a manner opposite to the prior art teachings, i.e. aliphatic amines cause an acceleration in the rate of gellation and thereby result in undesirably high foam densities. This unexpected behavior clearly shows that the process of the present invention is not related to the prior art processes.

| Formulation | Grams |
|---|---|
| Polyester Resin | 100 |
| 40% Aqueous tBZ.HCl | 1.25 |
| 45% Aqueous FeCl₃ | 0.30 |
| Lupersol DDM-9 | 3.0 |
| Aliphatic Amine (see table) | 1.0 |

| Aliphatic Amine | Gel Time (min) | Foam Density (lb/ft$^3$) |
|---|---|---|
| None (Invention) | 4.1 | 28 |
| Ethanolamine | 1.6 | 64 |
| Diethanolamine | 2.0 | 68 |
| Triethanolamine | 3.5 | 65 |
| Triethylamine | 0.5 | 66 |
| Dibutylamine | 1.0 | 51 |

It will be apparent to those skilled in this art that many modifications and changes may be made in the invention described without departing from the scope and spirit of the invention. It is our intention in the following claims to cover all such equivalent modifications and variations as fall within the true scope and spirit of the invention.

EXAMPLE 14

Effect of Solvent for Metal Salt on Foaming and Curing Activity

To facilitate mixing of the metal salt in the resin medium it is necessary to first dissolve the salt in a suitable solvent. The choice of solvent type for the inorganic metal salt can affect the reactivity of the foam system and in fact can be used advantageously as a further means for obtaining desired reactivity.

The results in the following table illustrate in general the effect of solvent type on reactivity of the foaming agent of the present invention.

| Solvent | H$_2$O | Ethanol | No Solvent |
|---|---|---|---|
| Resin A (g) | 100 | 100 | 100 |
| 50% (tBZ)$_2$.H$_2$SO$_4^{(1)}$ (g) | 1.5 | 1.5 | 1.5 |
| 45% FeCl$_3$ in H$_2$O (g) | 0.8 | — | — |
| 45% FeCl$_3$ in Ethanol (g) | — | 0.8 | — |
| Anhydrous FeCl$_3$ (g) | — | — | 0.36 |
| Lupersol DDM-9 (g) | 3.0 | 3.0 | 3.0 |
| Gel (Min) | 13.5 | 1.5 | 1.2 |
| Foam Density (Lb/Ft$^3$) | 25 | 25 | 60 |

$^{(1)}$Water Solvent

The above results show that if the inorganic metal salt, FeCl$_3$ in this case, is dissolved in alcohol one will obtain a faster gel time than if the salt is dissolved in water.

EXAMPLE 15

Shelf-Life of Resin Containing Blowing Agent and Metal Salt

This example illustrates one of the significant advantages of the present invention compared to Prior Art processes in terms of longer useful shelf-life of combinations of reactants.

The spray up process is a very popular technique for manufacturing useful molded products from reactive unsaturated polyester resins. The equipment used in this process is designed to combine in proper proportions two liquid components. It is desirable that these individual components exhibit good stability, i.e. their shelf-life should be at least 8 hours (a normal work shift) and preferably much longer.

In the process of the present invention one component would consist of the peroxide, for example methyl ethyl ketone peroxide. The second component would consist of the polyester resin, blowing agent and metal salt promoter. Other desirable additives such as fillers, surfactants, etc could also be incorporated in this component. Results in the following table show that the shelf life or useful life of the reactive resin mixture varies significantly with the type of metal promoter. Iron salts which are one of the preferred metal promoters of the present invention provide very long useful shelf life (>1 week) while organo metallic salts of the prior art, i.e. cobalt, nickel and potassium, provide very short shelf lives which would be undesirable in commercial processes.

| Component | Grams |
|---|---|
| Resin A | 100 |
| 40% Aqueous tBZ.HCl | 1.25 |
| Metal Salt | 0.045 g metal$^{(1)}$ |

$^{(1)}$Concentration of metal salt was varied to give equal metal concentrations

| Metal Salt Solution | Shelf-Life |
|---|---|
| None | 22 hours |
| Ferric chloride | >1 week |
| Ferrous chloride | >1 week |
| Ferric sulfate | >1 week |
| Iron naphthanate | >1 week |
| Cobalt neodecanoate | 11 minutes |
| Nickel octoate | 30 minutes |
| Potassium neodecanoate | 60 minutes |

What is claimed:

1. A foamable and curable composition comprising an admixture of an unsaturated polyester and a polymerizable unsaturated monomer or polymethylmethacrylate and a polymerizable unsaturated monomer, a peroxide, at least one transition metal salt promoter where at least one of the metals is selected from group consisting of iron and copper, and a t-alkylhydrazinium salt blowing agent.

2. The composition of claim 1 wherein the concentration of the medium is 100 parts, the peroxide is from about 0.2 to about 20 parts, the promoter is from about 0.01 to about 2.0 parts, and the blowing agent is from about 0.2 to about 10 parts.

3. The composition of claim 2 wherein the concentration of the peroxide is from about 0.5 to about 10 parts, the promoter is from about 0.05 to about 1.0 parts, and the blowing agent is from about 0.2 to about 5 parts.

4. The composition of claim 1 wherein a suitable surfactant is present in the composition.

5. The composition of claim 1 wherein said medium is an unsaturated polyester resin.

6. The composition of claim 1 wherein said peroxide is selected from the group of hydrogen peroxide, hydroperoxide, diacylperoxide, peroxidicarbonate, and ketone peroxides.

7. The composition of claim 1 wherein the promoter is selected from the group of ferric chloride, ferrous chloride, cuprous chloride, cupric chloride and copper naphthenate.

8. A method for preparing a foamed and cured resin comprising reacting the composition of claim 1 at ambient temperatures until foaming and curing have been effected.

9. The method of claim 8 wherein the metal salt is first added to the resin reaction mixture and thoroughly mixed, and next the blowing agent is added and thoroughly mixed, and lastly the peroxide is added and thoroughly mixed.

10. The method of claim 8 wherein the resin is an unsaturated polyester resin.

11. The method of claim 8 wherein the density of the foamed and cured resin is controlled by controlling the blowing agent and metal salt promoter.

* * * * *